(12) United States Patent
Hellman (10) Patent No.: US 7,843,997 B2
(45) Date of Patent: Nov. 30, 2010

(54) CONTEXT ADAPTIVE VARIABLE LENGTH CODE DECODER FOR DECODING MACROBLOCK ADAPTIVE FIELD/FRAME CODED VIDEO DATA

(75) Inventor: Timothy Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 1569 days.

(21) Appl. No.: 10/885,177

(22) Filed: Jul. 6, 2004

(65) Prior Publication Data

US 2005/0259741 A1 Nov. 24, 2005

Related U.S. Application Data

(60) Provisional application No. 60/573,107, filed on May 21, 2004.

(51) Int. Cl.
*H04N 7/12* (2006.01)
(52) U.S. Cl. ................... 375/240.18; 375/240.16; 375/240.24; 375/240.25
(58) Field of Classification Search ............ 375/240.18, 375/240.25, 240.24, 240.12, 240.01
See application file for complete search history.

(56) References Cited

U.S. PATENT DOCUMENTS

| | | | | |
|---|---|---|---|---|
| 6,115,070 A | * | 9/2000 | Song et al. ............. | 375/240.12 |
| 6,212,231 B1 | * | 4/2001 | Takano .................. | 375/240.24 |
| 6,269,484 B1 | * | 7/2001 | Simsic et al. ............... | 725/151 |
| 7,095,787 B2 | * | 8/2006 | Kadono et al. ......... | 375/240.27 |
| 7,099,387 B2 | * | 8/2006 | Bjontegaard et al. ........ | 375/240 |
| 7,346,111 B2 | * | 3/2008 | Winger et al. .......... | 375/240.24 |
| 7,379,608 B2 | * | 5/2008 | Marpe et al. ................. | 382/247 |
| 2004/0234144 A1 | * | 11/2004 | Sugimoto et al. ........... | 382/239 |
| 2005/0129129 A1 | * | 6/2005 | Winger et al. .......... | 375/240.24 |

\* cited by examiner

*Primary Examiner*—Tung Vo
*Assistant Examiner*—Anner Holder
(74) *Attorney, Agent, or Firm*—McAndrews, Held & Malloy, Ltd.

(57) ABSTRACT

Described herein is a context adaptive variable length code decoder for decoding macroblock adaptive field/frame coded video data. In one embodiment, there is presented a context adaptive variable length code decoder. The context adaptive variable length code decoder comprises a symbol decoder, and a left neighbor buffer. The symbol decoder decodes context adaptive variable length code symbols representing frequency coefficients associated with a partition of a macroblock. The left neighbor buffer stores information about another partition, the another partition being a left neighbor of the partition. The information about the another partition is overwritten by information about the partition.

21 Claims, 8 Drawing Sheets

CASE 1

CASE 3

CASE 2

CASE 4

Top Field 110T  Bottom Field 110B

FIGURE 5

CASE 1   CASE 2   CASE 3   CASE 4

CONTEXT ADAPTIVE VARIABLE LENGTH CODE DECODER FOR DECODING MACROBLOCK ADAPTIVE FIELD/FRAME CODED VIDEO DATA

RELATED APPLICATIONS

This application claims priority to Provisional Application for U.S. Patent, Ser. No. 60/573,107, entitled "Context Adaptive Variable Length Code Decoder for Decoding Macroblock Adaptive Field/Frame Coded Video Data", filed May 21, 2004, by Hellman, which is incorporated herein by reference in it entirety for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Encoding standards often use recursion to compress data. In recursion, data is encoded as a mathematical function of other previous data. As a result, when decoding the data, the previous data is needed.

An encoded picture is often assembled in portions. Each portion is associated with a particular. region of the picture. The portions are often decoded in a particular order. For decoding some of the portions, data from previously decoded portions is needed.

A video decoder typically includes integrated circuits for performing computationally intense operations, and memory. The memory includes both on-chip memory and off-chip memory. On-chip memory is memory that is located on the integrated circuit and can be quickly accessed. Off-chip memory is usually significantly slower to access than on-chip memory.

During decoding, storing information from portions that will be used for decoding later portions in on-chip memory is significantly faster than storing the information off-chip. However, on-chip memory is expensive, and consumes physical area of the integrated circuit. Therefore, the amount of data that on-chip memory can store is limited. In contrast, decoded video data generates very large amounts of data. Therefore, it may be impractical to store all of the decoded data on-chip.

The data needed for decoding a portion is typically contained in the neighboring portions that are decoded prior to the portion, such as the left neighbor. In many decoding orders, the left neighboring portion is decoded either immediately prior to the portion or shortly prior to the portion. In such a case, it can be possible to store some of the information from each portion for use in decoding the portions right neighbor.

However, the information needed from the left neighboring portion may not be determinable until after decoding the right neighboring portion.

Other limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein is a context adaptive variable length code decoder for decoding macroblock adaptive field/frame coded video data.

In one embodiment, there is presented a decoder for decoding symbols. The decoder comprises a symbol decoder, and a neighbor buffer. The symbol decoder decodes frequency coefficients associated with a portion of a picture. The neighbor buffer stores information about another portion of the picture, the another portion being adjacent to the portion. The symbol decoder decodes the frequency coefficients based on the information about the another portion of the picture and overwrites the information about the another portion with information about the portion.

In another embodiment, there is presented a method for decoding symbols. The method comprises storing information about a first portion of a picture, decoding frequency coefficients associated with a second portion of the picture based on the information about the first portion of the picture, and overwriting the information about the another portion with information about the second portion.

In another embodiment, there is presented an integrated circuit for decoding symbols. The integrated circuit comprises a symbol decoder, and a neighbor buffer. The symbol decoder is operable to decode frequency coefficients associated with a portion of a picture. The neighbor buffer is operable to store information about another portion of the picture, the another portion being adjacent to the portion. The neighbor buffer is connected to the symbol decoder. The symbol decoder decodes the frequency coefficients based on the information about the another portion of the picture and overwrites the information about the another portion with information about the portion.

These and other features and advantages of the present invention may be appreciated from a review of the following detailed description of the present invention along with the accompanying figures.

DETAILED DESCRIPTION OF THE INVENTION

Figure 1:
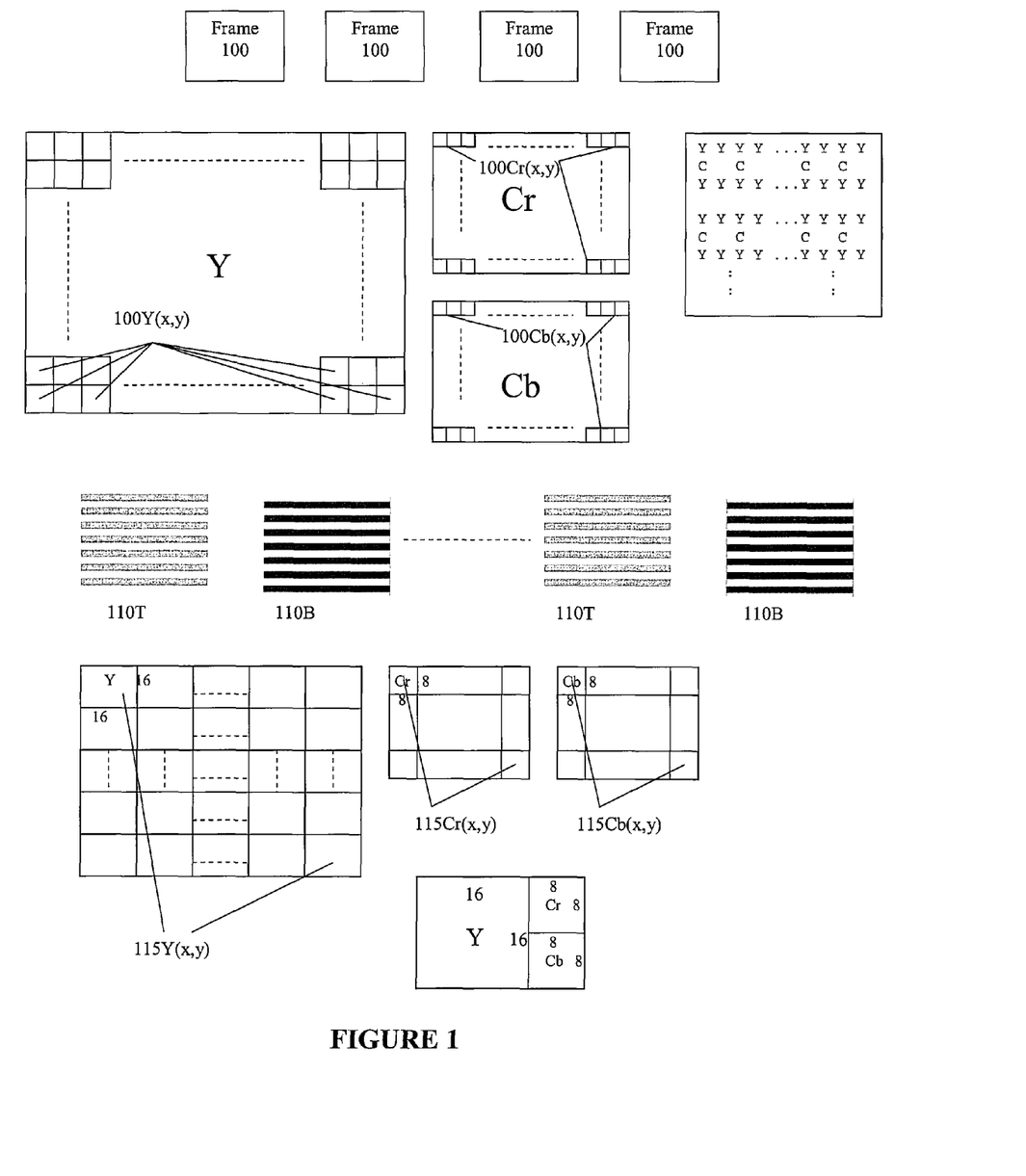
FIG. 1 is a block diagram of an exemplary frame.

Referring now to FIG. 1, there is illustrated a block diagram of a frame 100. A video camera captures frames 100 from a field of view during time periods known as frame durations. The successive frames 100 form a video sequence. A frame 100 comprises two-dimensional grid(s) of pixels 100(x,y).

For color video, each color component is associated with a two-dimensional grid of pixels. For example, a video can include a luma, chroma red, and chroma blue components. Accordingly, the luma, chroma red, and chroma blue components are associated with a two-dimensional grid of pixels 100Y(x,y), 100Cr(x,y), and 100Cb(x,y), respectively. When the grids of two dimensional pixels 100Y(x,y), 100Cr(x,y), and 100Cb(x,y) from the frame are overlayed on a display device 110, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels 100Y(x,y) compared to the grids of chroma red 100Cr(x,y) and chroma blue 100Cb(x,y). In the MPEG 4:2:0 standard, the grids of chroma red 100Cr(x,y) and chroma blue pixels 100Cb(x,y) have half as many pixels as the grid of luma pixels 100Y(x,y) in each direction.

The chroma red 100Cr(x,y) and chroma blue 100Cb(x,y) pixels are overlayed the luma pixels in each even-numbered column 100Y(x, 2y) between each even, one-half a pixel below each even-numbered line 100Y(2x, y). In other words, the chroma red and chroma blue pixels 100Cr(x,y) and 100Cb(x,y) are overlayed pixels 100Y(2x+½, 2y).

If the video camera is interlaced, the video camera captures the even-numbered lines 100Y(2x,y), 100Cr(2x,y), and 100Cb(2x,y) during half of the frame duration (a field duration), and the odd-numbered lines 100Y(2x+1,y), 100Cr(2x+1,y), and 100Cb(2x+1,y) during the other half of the frame duration. The even numbered lines 100Y(2x,y), 100Cr(2x,y), and 100Cb(2x,y) what is known as a top field 110T, while odd-numbered lines 100Y(2x+1,y), 100Cr(2x+1,y), and 100Cb(2x+1,y) form what is known as the bottom field 110B. The top field 110T and bottom field 110T are also two dimensional grid(s) of luma 110YT(x,y), chroma red 110CrT(x,y), and chroma blue 110CbT(x,y) pixels.

Luma pixels of the frame 100Y(x,y), or top/bottom fields 100YT/B(x,y) can be divided into 16×16 pixel 100Y(16x->16x+15, 16y->16y+15) blocks 115Y(x,y). For each block of luma pixels 115Y(x,y), there is a corresponding 8×8 block of chroma red pixels 115Cr(x,y) and chroma blue pixels 115Cb(x,y) comprising the chroma red and chroma blue pixels that are to be overlayed the block of luma pixels 115Y(x,y). A block of luma pixels 115Y(x,y), and the corresponding blocks of chroma red pixels 115Cr(x,y) and chroma blue pixels 115Cb(x,y) are collectively known as a macroblock 120. The macroblocks 120 can be grouped into groups known as slice groups.

The ITU-H.264 Standard (H.264), also known as MPEG-4, Part 10, and Advanced Video Coding, encodes video on a frame by frame basis, and encodes frames on a macroblock by macroblock basis. H.264 specifies the use of spatial prediction, temporal prediction, DCT transformation, interlaced coding, and lossless entropy coding to compress the macroblocks 120.

Spatial Prediction

Figure 2A:
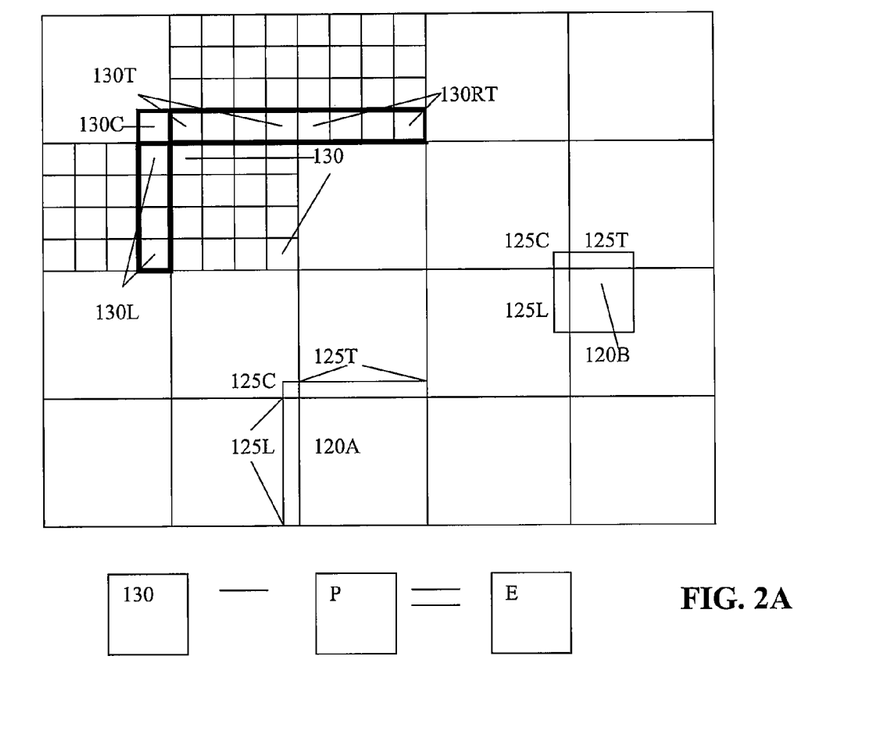
FIG. 2A is a block diagram describing spatially predicted macroblocks.

Referring now to FIG. 2A, there is illustrated a block diagram describing spatially encoded macroblocks 120. Spatial prediction, also referred to as intraprediction, involves prediction of frame pixels from neighboring pixels. The pixels of a macroblock 120 can be predicted, either in a 16×16 mode, an 8×8 mode, or a 4×4 mode.

In the 16×16 and 8×8 modes, e.g, macroblock 120a, and 120b, respectively, the pixels of the macroblock are predicted from a combination of left edge pixels 125L, a corner pixel 125C, and top edge pixels 125T. The difference between the macroblock 120a and prediction pixels P is known as the prediction error E. The prediction error E is calculated and encoded along with an identification of the prediction pixels P and prediction mode, as will be described.

In the 4×4 mode, the macroblock 120c is divided into 4×4 partitions 130. The 4×4 partitions 130 of the macroblock 120a are predicted from a combination of left edge partitions 130L, a corner partition 130C, right edge partitions 130R, and top right partitions 130TR. The difference between the macroblock 120a and prediction pixels P is known as the prediction error E. The prediction error E is calculated and encoded along with an identification of the prediction pixels and prediction mode, as will be described. A macroblock 120 is encoded as the combination of the prediction errors E representing its partitions 130.

Temporal Prediction

Figure 2B:
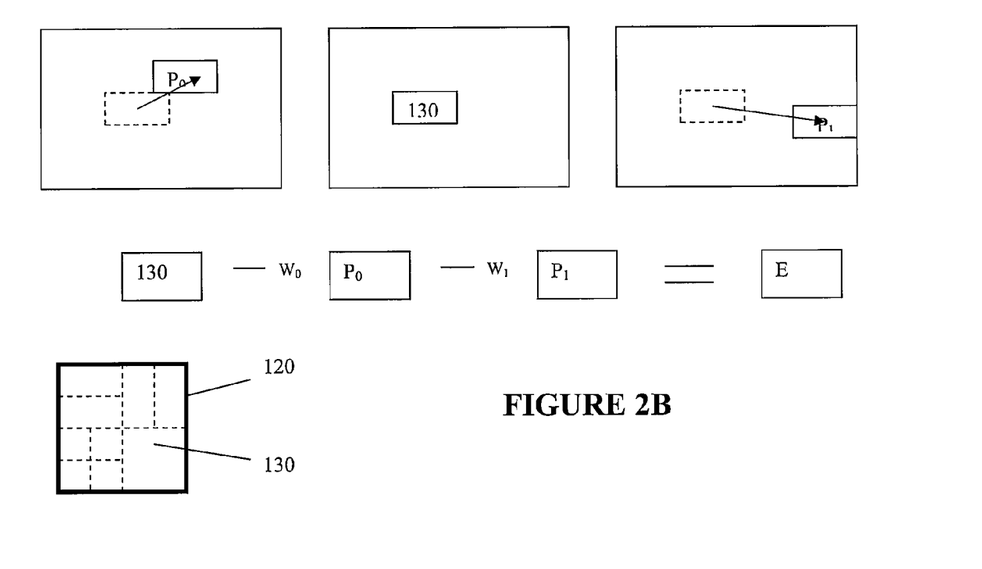
FIG. 2B is a block diagram describing temporally predicted macroblocks.

Referring now to FIG. 2B, there is illustrated a block diagram describing temporally encoded macroblocks 120. The temporally encoded macroblocks 120 can be divided into 16×8, 8×16, 8×8, 4×8, 8×4, and 4×4 partitions 130. Each partition 130 of a macroblock 120, is compared to the pixels of other frames or fields for a similar block of pixels P. A macroblock 120 is encoded as the combination of the prediction errors E representing its partitions 130.

The similar block of pixels is known as the prediction pixels P. The difference between the partition 130 and the prediction pixels P is known as the prediction error E. The prediction error E is calculated and encoded, along with an identification of the prediction pixels P. The prediction pixels P are identified by motion vectors MV. Motion vectors MV describe the spatial displacement between the partition 130 and the prediction pixels P. The motion vectors MV can, themselves, be predicted from neighboring partitions.

The partition can also be predicted from blocks of pixels P in more than one field/frame. In bi-directional coding, the partition 130 can be predicted from two weighted blocks of pixels, P0 and P1. According a prediction error E is calculated as the difference between the weighted average of the prediction blocks w0P0+w1P1 and the partition 130. The prediction error E, an identification of the prediction blocks P0, P1 are encoded. The prediction blocks P0 and P1 are identified by motion vectors MV.

The weights w0, w1 can also be encoded explicitly, or implied from an identification of the field/frame containing the prediction blocks P0 and P1. The weights w0, w1 can be implied from the distance between the frames/fields containing the prediction blocks P0 and P1 and the frame/field containing the partition 130. Where T0 is the number of frame/field durations between the frame/field containing P0 and the frame/field containing the partition, and T1 is the number of frame/field durations for P1, $$w0=1-T0/(T0+T1)$$

$$w1=1-T1/(T0+T1)$$

Transformation, Quantization, and Scanning

Figure 2C:
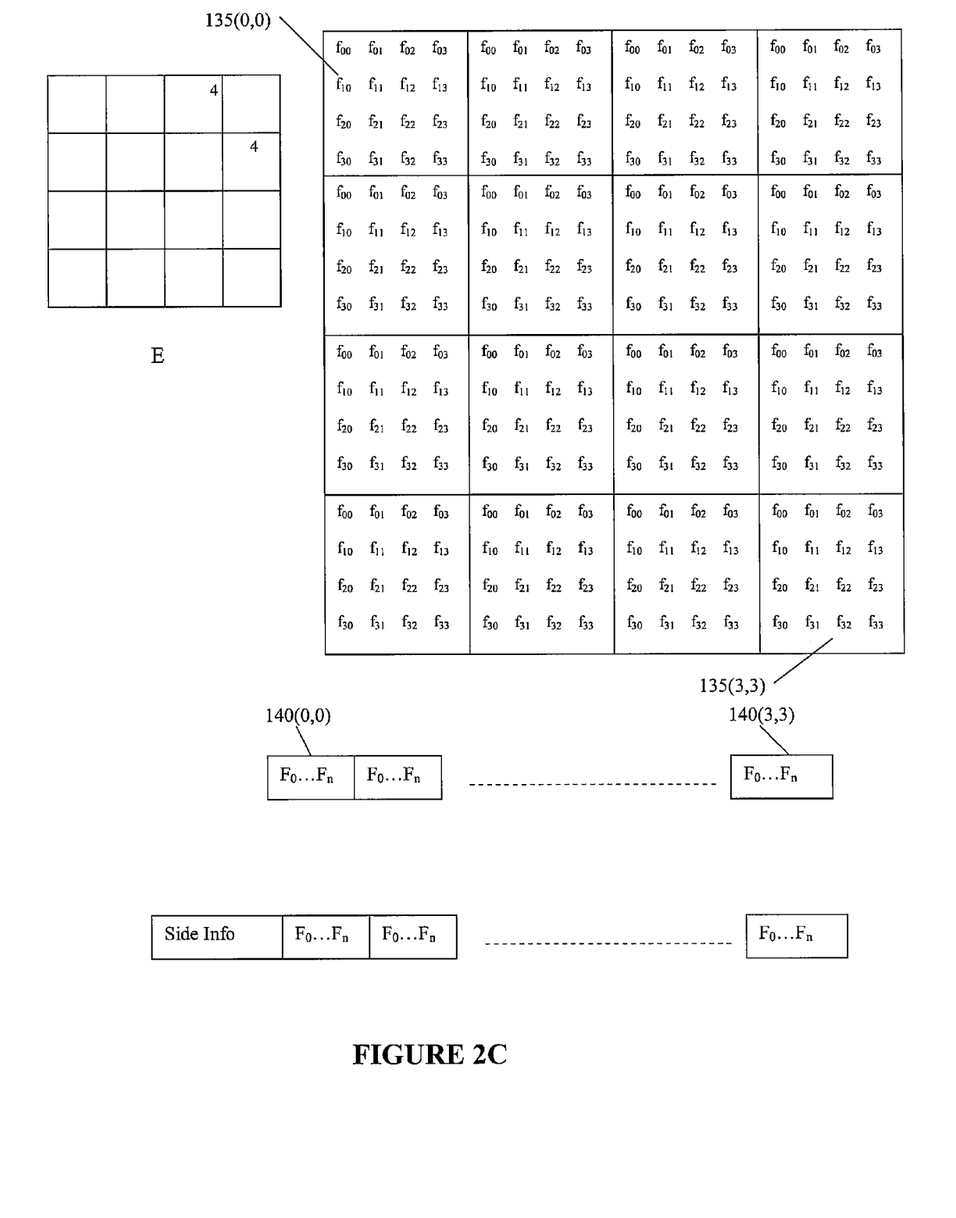
FIG. 2C is a block diagram describing the encoding of a prediction error.

Referring now to FIG. 2C, there is illustrated a block diagram describing the encoding of the prediction error E. With both spatial prediction and temporal prediction, the macroblock 120 is represented by a prediction error E. The prediction error E is also two-dimensional grid of pixel values for the luma Y, chroma red Cr, and chroma blue Cb components with the same dimensions as the macroblock 120.

A transformation transforms 4×4 partitions 130(0,0) ... 130(3,3) of the prediction error E to the frequency domain, thereby resulting in corresponding sets 135(0,0) ... 135(3,3) of frequency coefficients $F_{00} \ldots F_{33}$. The sets of frequency coefficients are then quantized and scanned, resulting in sets 140(0,0) ... 140(3,3) of quantized frequency coefficients, $F_0 \ldots F_n$. A macroblock 120 is encoded as the combination of its partitions 130.

Macroblock Adaptive Frame/Field (MBAFF) Coding

Figure 3:
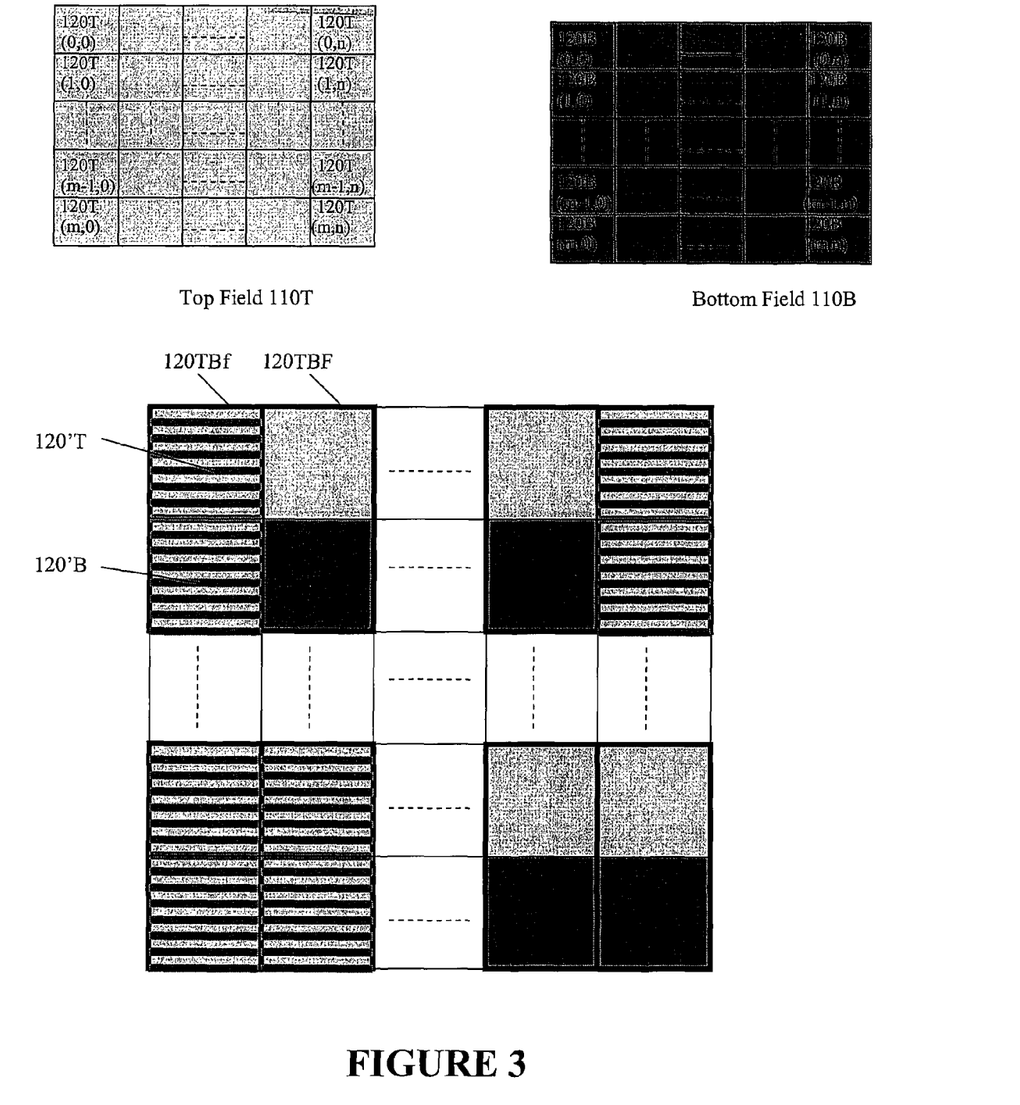
FIG. 3 is a block diagram describing the encoding of macroblocks for interlaced fields in accordance with macroblock adaptive frame/field coding.

Referring now to FIG. 3, there is illustrated a block diagram describing the encoding of macroblocks 120 for interlaced fields. As noted above, interlaced fields, top field 110T (x,y) and bottom field 110B(x,y) represent either even or odd-numbered lines.

In MBAFF, each macroblock 120T in the top field is paired with the macroblock 120B in the bottom field, that is interlaced with it. The macroblocks 120T and 120B are then coded as a macroblock pair 12TB. The macroblock pair 120TB can either be field coded, macroblock pair 120TBF or frame coded, macroblock pair 120TBf. Where the macroblock pair 120TBF are field coded, the macroblock 120T is encoded, followed by macroblock 120B. Where the macroblock pair 120TBf are frame coded, the macroblocks 120T and 120B are deinterlaced. The foregoing results in two new macroblocks 120'T, 120'B. The macroblock 120'T is encoded, followed by macroblock 120'B.

Entropy Coding

Referring again to FIG. 2C, the macroblocks 120 are represented by a prediction error E that is encoded as sets 140(0,0) ... 140(3,3) of quantized frequency coefficients $F_0 \ldots F_n$. The macroblock 120 is represented by side information, such as prediction mode indicators, and identification of prediction blocks.

Context Adaptive Variable Length Coding (CAVLC) is used to encode the frequency coefficients $F_0 \ldots F_n$. In H.264 the CAVLC used to encode the quantized frequency coefficients $F_0 \ldots F_n$, for a 4×4 partition 130(x,y) depends on the quantized frequency coefficients $F_0 \ldots F_n$ of its top neighboring partition 130(x-1,y) and left neighboring partition 130(x, y-1).

The frames 100 are encoded as the macroblocks 120 forming them. The video sequence is encoded as the frame forming it. The encoded video sequence is known as a video elementary stream. The video elementary stream is a bitstream that can be transmitted over a communication network to a decoder. Transmission of the bitstream instead of the video sequence consumes substantially less bandwidth.

Figure 4:
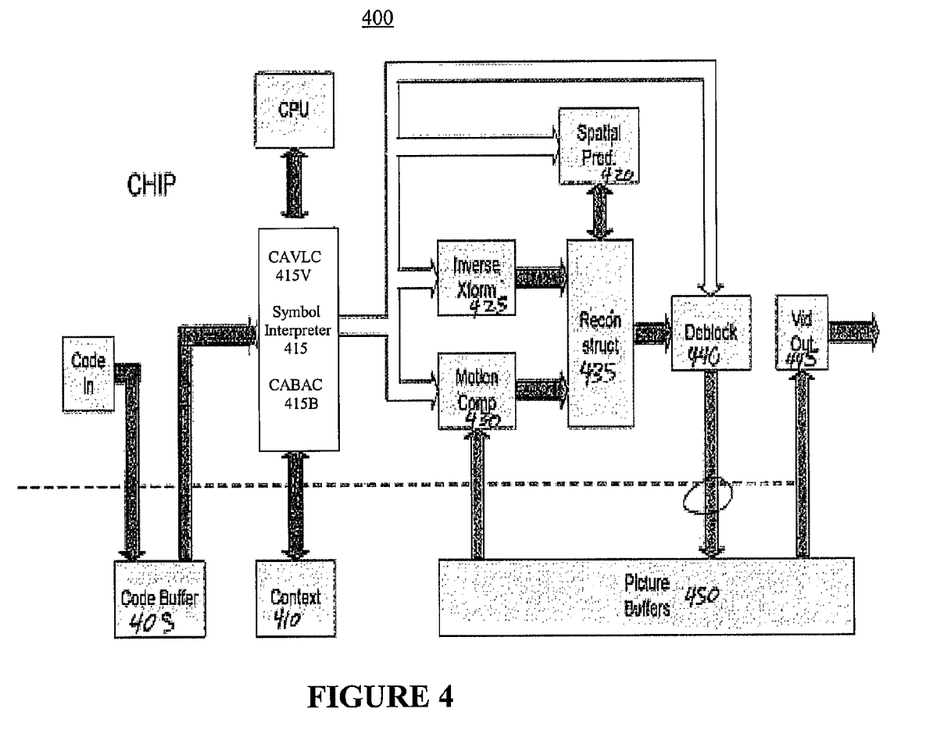
FIG. 4 is a block diagram of a video decoder in accordance with an embodiment of the present invention.

Referring now to FIG. 4, there is illustrated a block diagram describing an exemplary video decoder 400 in accordance with an embodiment of the present invention. The video decoder 400 includes a code buffer 405 for receiving a video elementary stream. The code buffer 405 can be a portion of a memory system, such as a dynamic random access memory (DRAM). A symbol interpreter 415 in conjunction with a context memory 410 decode the CABAC and CAVLC symbols from the bitstream. The context memory 410 can be another portion of the same memory system as the code buffer 405, or a portion of another memory system.

The symbol interpreter 415 includes a CAVLC decoder 415V. The CAVLC decoder 415V decodes CAVLC symbols, resulting in the sets 140 of quantized frequency coefficients $F_0 \ldots F_n$.

The symbol interpreter 415 provides the sets of scanned quantized frequency coefficients $F_0 \ldots F_n$ to an inverse scanner, quantizer, and transformer (ISQDCT) 425. Depending on the prediction mode for the macroblock 120 associated with the scanned quantized frequency coefficients $F_0 \ldots F_n$, the symbol interpreter 415 provides the side information to either a spatial predictor 420 (if spatial prediction) or a motion compensator 430 (if temporal prediction).

The ISQDCT 425 constructs the prediction error E. The spatial predictor 420 generate the prediction pixels P for spatially predicted macroblocks while the motion compensator 430 generates the prediction pixels P, or P0, P1 for temporally predicted macroblocks. The motion compensator 430 retrieves the prediction pixels P, or P0, P1 from picture buffers 450 that store previously decoded frames 100 or fields 110.

A pixel reconstructor 435 receives the prediction error E from the ISQDCT 425, and the prediction pixels from either the motion compensator 430 or spatial predictor 420. The pixel reconstructor 435 reconstructs the macroblock 120 from the foregoing information and provides the macroblock 120 to a deblocker 440. The deblocker 440 smoothes pixels at the edge of the macroblock 120 to prevent the appearance of blocking. The deblocker 440 writes the decoded macroblock 120 to the picture buffer 450.

A display engine 445 provides the frames 100 from the picture buffer 450 to a display device. The symbol interpreter 415, the ISQDCT 425, spatial predictor 420, motion compensator 430, pixel reconstructor 435, and display engine 445 can be hardware accelerators under the control of a central processing unit (CPU).

As noted above, the symbol interpreter 415 includes a CAVLC decoder 415V that decodes the quantized frequency coefficients $F_0 \ldots F_n$ for partitions 130. However, the CAVLC coding of the quantized frequency coefficients $F_0 \ldots F_n$ for a partition 130(x,y) depends on the quantized frequency coefficients $F_0 \ldots F_n$ from the top neighbor partition 130(x-1, y), and left neighboring partition 130(x, y-1). In the case of the row of partitions 130(0,y) at the top of a macroblock, information from the bottom row 130(3,y) of partitions of the above macroblock is needed. In the case of the column of partitions 130(x,0) at the left of a macroblock, information from the right edge 130(x,3) of the right neighboring macroblock is used.

Figure 5:
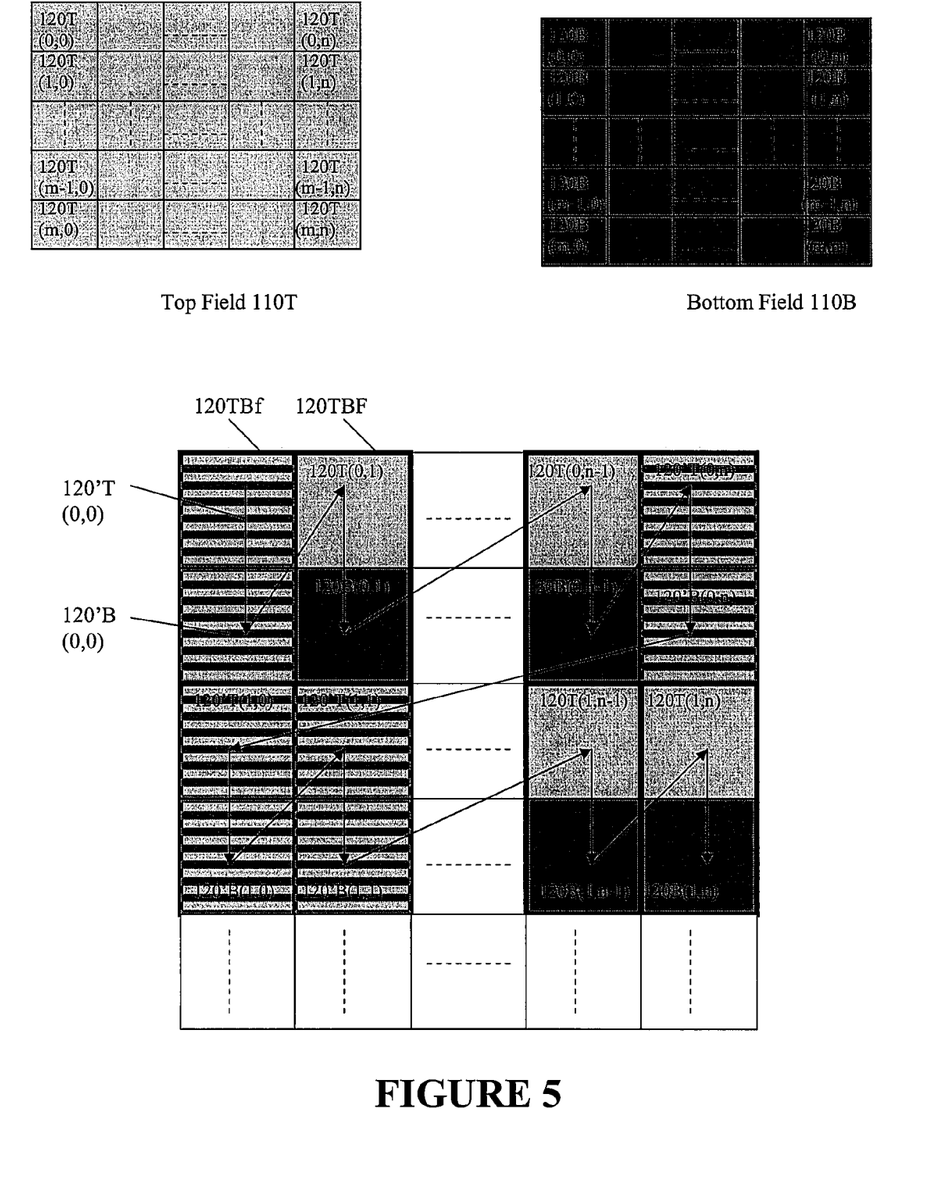
FIG. 5 is a block diagram describing the decoding order for a video decoder in accordance with an embodiment of the present invention.

Referring now to FIG. 5, there is illustrated a block diagram describing the decoding order of the video decoder, in accordance with an embodiment of the present invention. For interlaced fields 110T, 110B with MBAFF encoding, the video decoder 400 decodes the macroblocks in pairs, starting with the macroblock pair 120T(0,0), 120B(0,0) at the top corners of the top field 110T and bottom field 110B and proceeding across the top row of macroblocks 120T(0,n), 120B(0,n). The video decoder 400 then proceeds to the left most macroblock of the next row of macroblocks 120T(1,0), 120B(1,0) and proceeds to the right, and so forth.

The macroblock pairs represent 32×16 pixel blocks of the frame 100. However, where the macroblock pairs are frame coded, such as macroblocks 120TBf, the reconstructed macroblocks 120'T(0,0), 120'B(0,0) represented the top and bottom halves of macroblocks 120T(0,0) and 120B(0,0) deinterlaced. Macroblock 120'T(0,0) includes the first eight lines of pixels from macroblocks 120T(0,0) and 120B (0,0) . Macroblock 120'B (0,0) includes the last eight lines of pixels from macroblocks 120T(0,0) and 120B(0,0).

As noted above, the CAVLC coding for frequency coefficients $F_0 \ldots F_n$ for partitions 130 is dependent on the frequency coefficients of the top and left neighboring partitions. The CAVLC coding of frequency coefficients $F_0 \ldots F_n$ of the top row and left column of partitions in a macroblock 120 depends on the bottom row of partitions of the top neighboring macroblock and the right column of partitions of the left neighboring macroblock.

The location of the bottom row of partitions of the top neighboring macroblock and the right column of partitions of the left neighboring macroblock depend on whether the macroblock pair, the left neighboring macroblock pair, and the top neighboring macroblock pair are frame or field coded.

Figure 6:
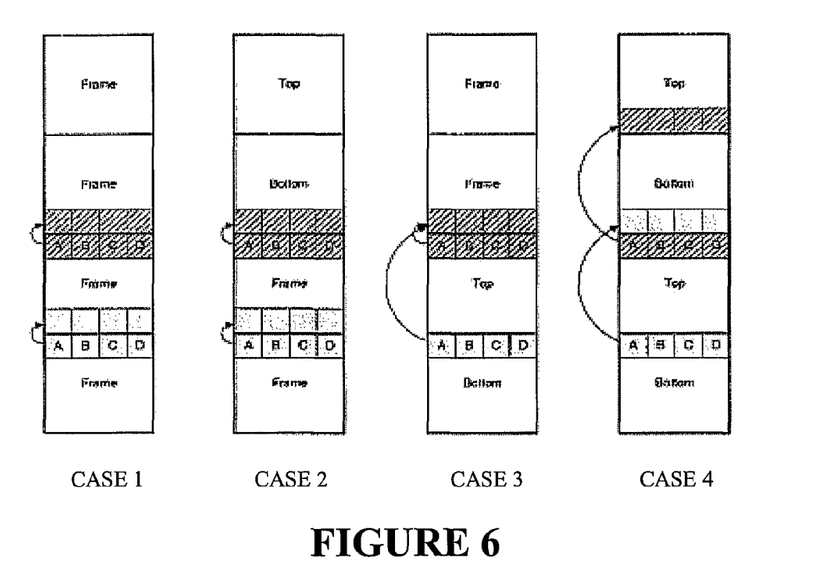
FIG. 6 is a block diagram describing top neighboring partitions.

Referring now to FIG. 6, there is illustrated a block diagram describing the top neighboring partitions for the top row of partitions in macroblock pairs 120TB. In case 1, the macroblock pair 120TB and its top neighbor macroblock pair 120TB are both frame coded. The top neighbor partitions for partitions A, B, C, D are as indicated by the arrows.

In case 2, the macroblock pair 120TB is frame coded while its top neighbor macroblock pair 120TB is field coded. The top neighbor partitions for partitions A, B, C, D are as indicated by the arrows.

In case 3, the macroblock pair 120TB is field coded while its top neighbor macroblock pair 120TB is frame coded. The top neighbor partitions for partitions A, B, C, D are as indicated by the arrows.

In case 4, the macroblock pair 120TB and its top neighbor macroblock pair 120TB are both field coded. The top neighbor partitions for partitions A, B, C, D are as indicated by the arrows.

Figure 7:
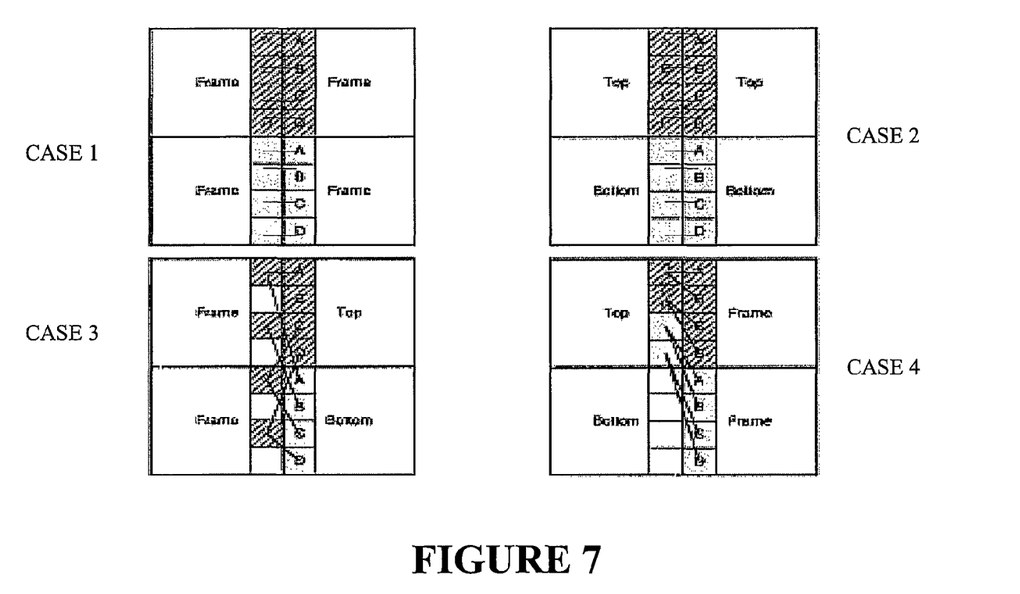
FIG. 7 is a block diagram describing left neighboring partitions.

Referring now to FIG. 7, there is illustrated a block diagram describing the left neighboring partitions for the left column of partitions in macroblock pairs 120TB. In case 1, the macroblock pair 120TB and its left neighbor macroblock pair 120TB are both frame coded. The left neighbor partitions for partitions A, B, C, D are as indicated by the lines.

In case 2, the macroblock pair 120TB and its left neighbor macroblock pair 120TB are both field coded. The left neighbor partitions for partitions A, B, C, D are as indicated by the lines.

In case 3, the macroblock pair 120TB is field coded while its left neighbor macroblock pair 120TB is frame coded. The left neighbor partitions for partitions A, B, C, D are as indicated by the lines.

In case 4, the macroblock pair 120TB is frame coded while its left neighbor macroblock pair 120TB is field coded. The left neighbor partitions for partitions A, B, C, D are as indicated by the lines.

Figure 8:
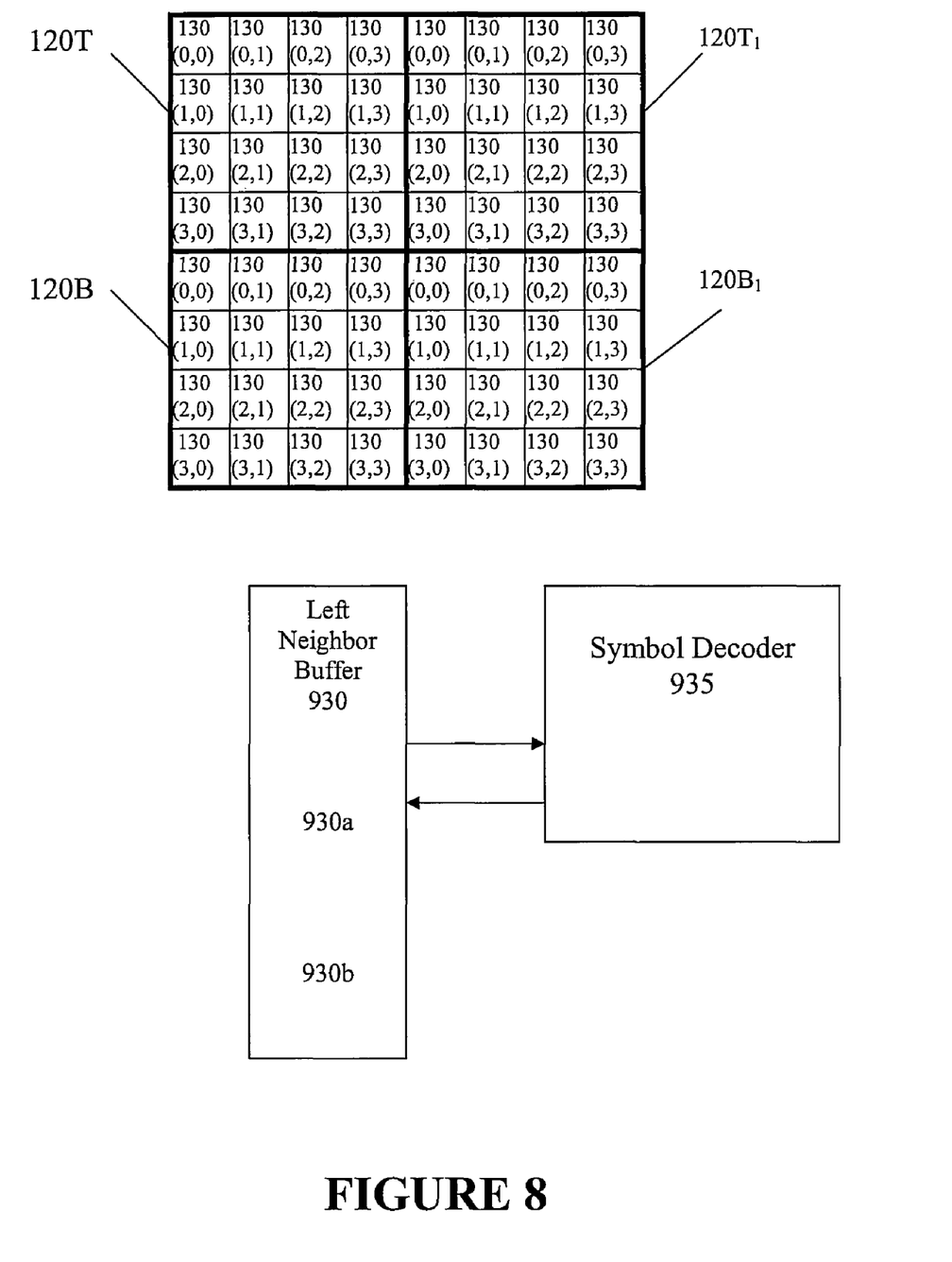
FIG. 8 is a block diagram describing a CAVLC decoder in accordance with an embodiment of the present invention.

Referring now to FIG. 8, there is illustrated a block diagram describing certain aspects of the CAVLC decoder 415V, in accordance with an embodiment of the present invention. The CAVLC decoder 415V includes a left neighbor buffer 930 and a symbol decoder 935.

The symbol decoder 935 decodes the CAVLC symbols encoding the frequency coefficients $F_0 \ldots F_n$ for partitions 130. The CAVLC decoder 415V receives the video data on a macroblock by macroblock 120 basis.

When the CAVLC decoder 415V decodes the CAVLC coding of the frequency coefficients for a column of partitions 130(x,N) in macroblock 120T, the CAVLC decoder 415V writes the number of frequency coefficients n for each partition 130(x,N) to one half 930a of the left neighbor buffer 930. The symbol decoder 935 uses the foregoing information, as well as information regarding the top neighboring partition (fetched from DRAM) to decode the CAVLC coding of the frequency coefficients $F_0 \ldots F_n$ for the next column of partitions 130(x, N+1) in the macroblock 120T.

The half of the left neighbor buffer 930a overwrites the number of frequency coefficients n for the previous column with the number of frequency coefficients n for the current column for use in decoding the next column. The foregoing continues until the CAVLC coding of the frequency coefficients $F_0 \ldots F_n$ is decoded for each partition 130 of a macroblock 120.

The CAVLC decoder 415V then decodes the CAVLC coding of the frequency coefficients for the next macroblock 120B. If the next macroblock 120B is the bottom macroblock 120B of a macroblock pair 120TB, the CAVLC decoder 415V decodes the CAVLC coding for the frequency coefficients $F_0 \ldots F_n$ of the macroblock 120B, using the other half of the left neighbor buffer 930b.

After decoding a macroblock pair 120TB, the left neighbor buffer 930 includes the number of frequency coefficients for the right column of partitions 130(x,3) of the macroblocks 120T and 120B. When decoding the next macroblocks $120T_1$ and $120B_1$, the information from the right column of partitions 130(x,3) of macroblocks 120T and 120B, the left neighbors of partitions 130(x,0) of macroblocks $120T_1$ and $120B_1$, is stored in the left neighbor buffer 930.

The symbol decoder 935 uses the information stored for the particular ones of the right column partitions 130(x,3) of macroblocks 120T and 120B to decode CAVLC coding for partitions 130(x,0) of macroblock 120T. The particular ones of the right column partitions 130(x,3) of macroblock 120T and 120B are selected based on whether the coding type (field/frame) of each macroblock pair, as indicated in the FIG. 7.

As the symbol decoder 935 generates the frequency coefficients for the left column of partitions 130(x,0) for macroblock $120T_1$, the information regarding the left column of partitions 130(x,0) is written to the left neighbor buffer 930. If the macroblock pairs 120T, 120B, and $120T_1$, $120B_1$ correspond to cases 1 or 2 of FIG. 7, the information about the partitions 130(x,0) in macroblock $120T_1$ overwrites the selected partitions 130(x,3). If the macroblock pairs 120T, 120B, and $120T_1$, $120B_1$ correspond to cases 3 or 4 of FIG. 7, the information about the partitions 130(x,0) in macroblock $120T_1$, overwrites the remaining partitions from the selected partitions 130(x,3).

When the symbol decoder 935 decodes the CAVLC coding of the frequency coefficients for the left column of partitions 130(x,0) of macroblock $120B_1$, the information regarding the left column of partitions 130(x,0) overwrites the partitions 130(x,3) opposite from the partitions 130(x,3) overwritten when generating frequency coefficients for macroblock $120T_1$.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. For example, although the embodiments have been described with a particular emphasis on the H.264 standard, the teachings of the present invention can be applied to many other standards without departing from it scope. Therefore, it is intended that the present invention not be limited to the particular embodiment disclosed, but that the present invention will include all embodiments falling within the scope of the appended claims.

The invention claimed is:

1. A video system comprising:
   a symbol decoder for decoding frequency coefficients associated with a portion of a picture, wherein the portion comprises a pair of macroblocks, and wherein the frequency coefficients for the pair of macroblocks are decoded together; and
   a neighbor buffer for storing information about another portion of the picture, said another portion being adjacent to the portion and comprising another pair of macroblocks;
   wherein the macroblocks of the another portion are field coded, and wherein the macroblocks of the portion are frame coded; and
   wherein the symbol decoder decodes the frequency coefficients for the macroblocks of the portion that are field coded based on the information about the macroblocks of the another portion of the picture that are frame coded and adjacent and overwrites the information about the another portion with information about the portion.

2. The video system of claim 1, wherein the symbol decoder decodes frequency coefficients associated with the portion of the picture and the another portion of the picture consecutively, wherein the symbol decoder decodes the frequency coefficients of the another portion before decoding the frequency coefficients of the portion.

3. The video system of claim 1, wherein the symbol decoder decodes frequency coefficients from a third portion of the picture based on the information about the portion of the picture.

4. The video system of claim 1, wherein the frequency coefficients associated with the portion and the frequency coefficients associated with the another portion are encoded with a context adaptive variable length code.

5. A method for decoding symbols, said method comprising:
   storing information about a first portion of a picture, wherein the first portion comprises a pair of macroblocks, and wherein the frequency coefficients for the pair of macroblocks are decoded together in a memory;
   wherein the macroblocks of the first portion are field coded, and wherein macroblocks of a second portion are frame coded;
   decoding frequency coefficients associated with the macroblocks of the second portion that are frame coded of the picture based on the information about the macroblocks of the first portion that are field coded of the picture, wherein the first portion and the second portion are adjacent, wherein the second portion comprises another pair of macroblocks, and wherein the frequency coefficients for the another pair of macroblocks are decoded together; and
   overwriting the information about the first portion with information about the second portion.

6. The method of claim 5, further comprising:
   decoding frequency coefficients associated with the first portion of the picture; and
   wherein decoding frequency coefficients associated with the first portion of the picture and decoding frequency coefficients associated with the second portion of the picture are consecutive wherein the first portion is decoded before the second portion.

7. The method of claim 5, further comprising:
   decoding frequency coefficients from a third portion of the picture based on the information about the portion of the picture.

8. The method of claim 5, wherein the frequency coefficients associated with the portion and the frequency coefficients associated with the another portion are encoded with a context adaptive variable length code.

9. A system for decoding data, said system comprising:
   an integrated circuit for decoding symbols, said integrated circuit comprising:
   a symbol decoder operable to decode frequency coefficients associated with a portion of a picture; and
   a neighbor buffer operable to store information about another portion of the picture, said another portion being adjacent to the portion, said neighbor buffer operably coupled to the symbol decoder;
   wherein the symbol decoder decodes the frequency coefficients based on the information about the another portion of the picture and overwrites the information about the another portion with information about the portion, and wherein the portion is field coded and wherein the another portion is frame coded.

10. The video system of claim 1, wherein decoding the pair of macroblocks together further comprises decoding the pair of macroblocks consecutively.

11. The video system of claim 1, wherein the information about the another portion comprises information about one of the another pair of macroblocks and information about the other of the another pair of macroblocks, and wherein the information about the portion comprises information about one of the pair of macroblocks and information about the other of the pair of macroblocks.

12. The video system of claim 11, wherein decoding the frequency coefficients further comprises:
   decoding frequency coefficients associated with one of the pair of macroblocks based on some of the information about the one of the another pair of macroblocks and some of the information about the other of the another pair of macroblocks.

13. The video system of claim 11, wherein decoding the frequency coefficients further comprises:
   decoding frequency coefficients associated with the one of the pair of macroblocks and the another of the pair of macroblocks using the information about the one of the another pair of macroblocks.

14. The video system of claim 1, wherein each of the another pair of macroblocks comprise a plurality of columns of partitions, and wherein each partition is associated with a set of frequency coefficients, and wherein the information about the another portion of the picture comprises a set of integers, wherein each of the set of integers corresponds with each partition of a particular column, and wherein each of the set of integers indicates the number frequency coefficients that are associated with the corresponding partition.

15. The method of claim 5, wherein decoding the pair of macroblocks together further comprises decoding the pair of macroblocks consecutively.

16. The method of claim 5, wherein the information about the first portion comprises information about one of the first pair of macroblocks and information about the other of the first pair of macroblocks, and wherein the information about the second portion comprises information about one of the pair of macroblocks and information about the other of the pair of macroblocks.

17. The method of claim 16, wherein decoding the frequency coefficients further comprises:
decoding frequency coefficients associated with one of the pair of macroblocks based on some of the information about the one of the another pair of macroblocks and some of the information about the other of the another pair of macroblocks.

18. The method of claim 16, wherein decoding the frequency coefficients further comprises:
decoding frequency coefficients associated with the pair of macroblocks of the first portion and the another of the pair of macroblocks of the second portion using the information about the one of the pair of macroblocks of the second portion.

19. The method of claim 5, wherein each of the another pair of macroblocks comprise a plurality of columns of partitions, and wherein each partition is associated with a set of frequency coefficients, and wherein the information about the another portion of the picture comprises a set of integers, wherein each of the set of integers corresponds with each partition of a particular column, and wherein each of the set of integers indicates the number frequency coefficients that are associated with the corresponding partition.

20. The integrated circuit of claim 19, wherein decoding the frequency coefficients further comprises:
decoding frequency coefficients associated with one of the portions based on some of the information about the the another portion.

21. The integrated circuit of claim 9, wherein each of the portions comprise a plurality of columns of partitions, and wherein each partition is associated with a set of frequency coefficients, and wherein the information about the another portion of the picture comprises a set of integers, wherein each of the set of integers corresponds with each partition of a particular column, and wherein each of the set of integers indicates the number frequency coefficients that are associated with the corresponding partition.

* * * * *